United States Patent
Jha et al.

(10) Patent No.: US 12,120,550 B2
(45) Date of Patent: Oct. 15, 2024

(54) ALWAYS-ON MOBILITY-AS-A-SERVICE CONNECTIVITY

(71) Applicant: Intel Corporation, Santa Clara, CA (US)

(72) Inventors: Satish Chandra Jha, Portland, OR (US); S M Iftekharul Alam, Hillsboro, OR (US); Ned M. Smith, Beaverton, OR (US); Vesh Raj Sharma Banjade, Portland, OR (US); Xiaoyun May Wu, Portland, OR (US); Ignacio Javier Alvarez Martinez, Portland, OR (US); Arvind Merwaday, Beaverton, OR (US); Kuilin Clark Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 785 days.

(21) Appl. No.: 17/131,407

(22) Filed: Dec. 22, 2020

(65) Prior Publication Data

US 2021/0112456 A1    Apr. 15, 2021

(51) Int. Cl.
| | |
|---|---|
| H04W 28/10 | (2009.01) |
| H04L 41/147 | (2022.01) |
| H04W 28/02 | (2009.01) |
| H04W 40/24 | (2009.01) |
| H04W 40/30 | (2009.01) |

(52) U.S. Cl.
CPC .......... *H04W 28/10* (2013.01); *H04L 41/147* (2013.01); *H04W 28/0284* (2013.01); *H04W 40/246* (2013.01); *H04W 40/30* (2013.01)

(58) Field of Classification Search
CPC . H04W 28/02; H04W 28/10; H04W 28/0284; H04W 40/24; H04W 40/30; H04W 40/246; H04W 72/12; H04W 72/56; H04L 41/14; H04L 41/147; H04L 69/08; H04L 1/1854; H04L 1/1877; H04L 1/189
See application file for complete search history.

(56) References Cited

U.S. PATENT DOCUMENTS

| | | | | | |
|---|---|---|---|---|---|
| 5,404,505 | A | * | 4/1995 | Levinson ................. | H04N 7/20 725/138 |
| 2007/0072629 | A1 | * | 3/2007 | Bae ................... | H04M 1/72451 455/461 |

(Continued)

FOREIGN PATENT DOCUMENTS

| | | | | |
|---|---|---|---|---|
| CN | 111625604 | * | 9/2020 | ............. G06F 16/23 |

OTHER PUBLICATIONS

"DMA Technical Manual 8358.1, Chapter 3. Datums, Ellipsoids, Grids, and Grid Reference Systems", National Geospatial Agency, Edition 1, (Sep. 1990), 29 pgs.

(Continued)

*Primary Examiner* — Warner Wong
(74) *Attorney, Agent, or Firm* — Schwegman Lundberg & Woessner, P.A.

(57) ABSTRACT

Various systems and methods for improving connectivity of a Mobility-as-a-Service (MaaS) node are described herein, including categorizing MaaS communication traffic of a MaaS node into different levels of priority and controlling duplication or repetition of the MaaS communication traffic using the categorized level of priority of the MaaS communication traffic.

40 Claims, 6 Drawing Sheets

(56) References Cited

U.S. PATENT DOCUMENTS

| | | | | |
|---|---|---|---|---|
| 2018/0262411 | A1* | 9/2018 | Yu | H04B 17/309 |
| 2018/0375621 | A1* | 12/2018 | Turtinen | H04L 1/0003 |
| 2019/0149475 | A1* | 5/2019 | Martin | H04L 47/24 |
| | | | | 370/235 |
| 2021/0266907 | A1* | 8/2021 | Cui | H04W 24/10 |
| 2021/0400503 | A1* | 12/2021 | Wang | H04L 45/24 |
| 2021/0409314 | A1* | 12/2021 | Murao | G06Q 20/02 |
| 2022/0417923 | A1* | 12/2022 | Uchiyama | H04W 4/40 |

OTHER PUBLICATIONS

"Geohash Tips and Tricks", #geohas.org, http: geohash.org sile lips.html#formal, (Nov. 19, 2018), 2 pgs.

Grassi, G, "Navigo: Interest Forwarding by Geolocations in Vehicular Named Data Networking", IEEE WoWMoM,, (2015), 9 pgs.

Krol, Michal, "NFaaS: named function as a service", In Proceedings of the 4th ACM Conference on Information—Centric Networking. ACM, (Sep. 28, 2017), 134-144.

Liu, "ICN-FC: An Information-Centric Networking Based Framework for Efficient Functional Chaining", IEEE International Conference on Communications (ICC), (May 25, 2017), 7 pgs.

Shainer, G, "Next Generation of Co-Processors Emerges: In-Network Computing", Mellanox Technologies, (2016), 21 pgs.

Sifalakis, M, "An Information Centric Network for Computing the Distribution of Computations", 1st International ACM Conference in Information Centric Networking (ACM ICN 2014),, (Sep. 2014), 137-146.

Ansari, R I, "5G D2D Networks: Techniques, Challenges, and Future Prospects", IEEE Systems Journal, vol. 12, No. 4, (Dec. 2018), pp. 3970-3984.

Jacob, R, "Hybrid V2X Communications: Multi-RAT as Enabler for Connected Autonomous Driving", 2018 IEEE 29th Annual International Symposium on Personal, Indoor and Mobile Radio Communications (PIMRC), Bologna, (2018), pp. 1370-1376.

Schellmann, M, "Ultra-reliable V2X communication: On the value of user cooperation in the sidelink", 2019 European Conference on Networks and Communications (EuCNC), Valencia, Spain, (2019), pp. 570-574.

Sweidan, Zahraa, "Optimized flow assignment for applications with strict reliability and latency constraints using path diversity", Journal of Computational Science, vol. 44, (2020), 9 pgs.

Yuan, Z, "ComProSe: Shaping Future Public Safety Communities with ProSe-Based UAVs", in IEEE Communications Magazine, vol. 55, No. 12, (Dec. 2017), pp. 165-171.

\* cited by examiner

ALWAYS-ON MOBILITY-AS-A-SERVICE CONNECTIVITY

TECHNICAL FIELD

Embodiments described herein generally relate to mobility-as-a-service (MaaS), and in particular, to always-on MaaS connectivity.

BACKGROUND

Three major components of mobility-as-a-service (MaaS) are fleet management, emergency response systems, and user-initiated route planning. Frequent or continuous communication among MaaS nodes and a central MaaS controller is required for optimal performance. For example, emergency response systems require real-time maintenance data, determination of imminent failure, and prioritized connectivity with emergency services in unexpected situations. User-initiated multimodal trip planning requires "always-on" connectivity with the network for uninterrupted or optimal route guidance. Fleet management requires real-time access to vehicle information, such as location, occupancy, mileage, fuel consumption, etc. Vehicles, as used herein, can include vehicles, fleet vehicles, manual or partially or fully autonomous vehicles, robotic infrastructure, etc. As MaaS nodes (e.g., MaaS assets) move through different areas with varied communication infrastructure, maintaining "always-on" connectivity can be challenging.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

The present inventors have recognized, among other things, systems and methods to prioritize MaaS communication traffic to maintain at least MaaS emergency communication (e.g., an emergency request/response communication, etc.) throughout an area. For example, MaaS communication traffic can be prioritized based on a goal or intent of the traffic. Different communication paths available for MaaS communication traffic have different link qualities depending on, for example, mobility, blockage from tunnels, buildings, etc. Continuous discovery of potential alternative or redundant communication paths can be implemented to maintain connectivity, with respect to geo-area specific contexts (e.g., a known presence of a long tunnel triggering multi-hop communication), location of nearby vehicles, etc.

Figure 1:
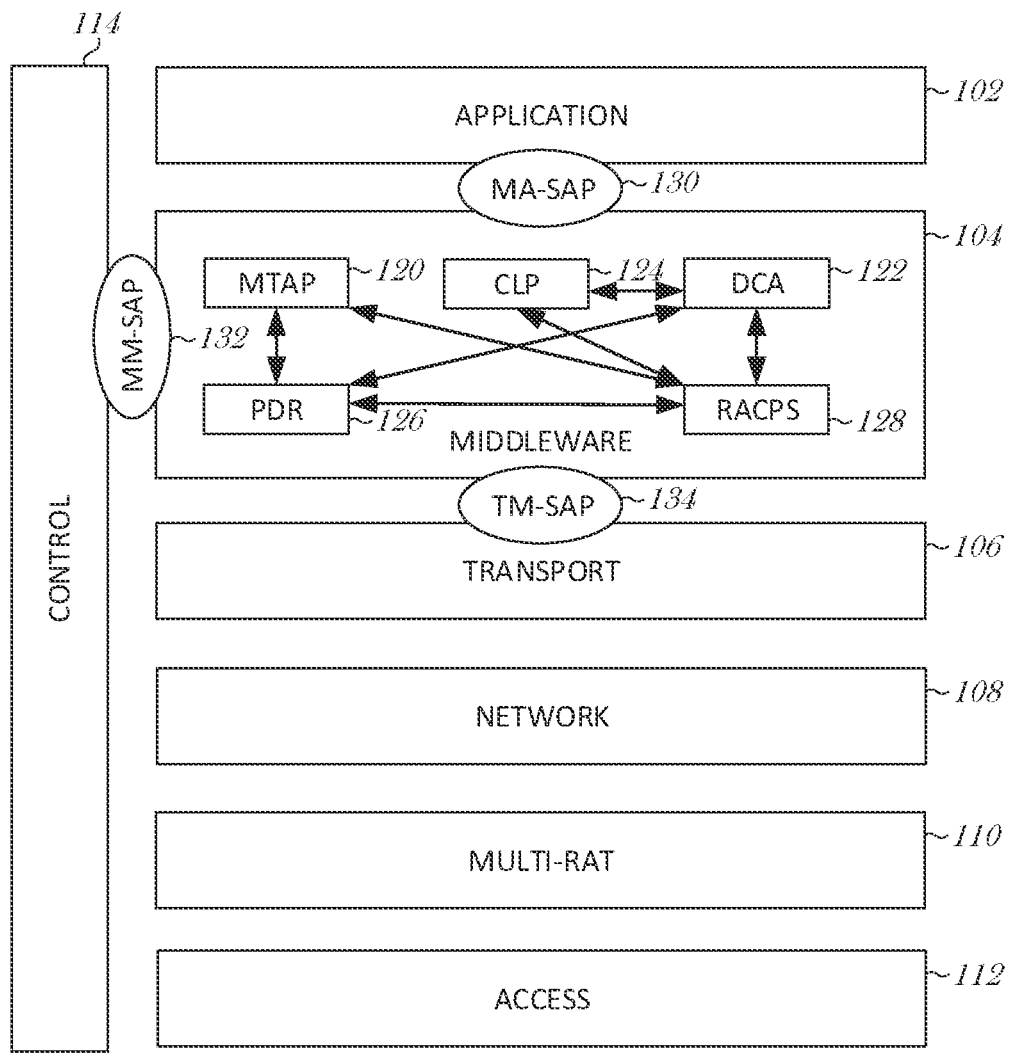
FIG. 1 illustrates example layers of a protocol stack to implement MaaS operations.

Existing discovery methods rely on periodic message exchanges that do not meet specific MaaS communication needs. Selection of alternative paths for a MaaS packet or packet-category at higher layer (such as a middleware layer below or immediately below an application layer) can result in transmission through different radio access technologies (RATs) or with different number of hops. MaaS specific metadata (e.g., data that provides information about other data, such as MaaS connectivity-assistance information, etc.) can be defined at a middleware layer and passed to lower layers to effectively execute decisions made at middleware and enable MaaS-Application aware operations at the lower layers. In an example, the term higher layer can refer to application and middleware layers (or the application layer and the layer immediately below the application layer), and lower layer can include layers of a protocol stack below the higher layers, such as a transport layer, a network layer, a multi-radio-access-technology (multi-RAT) convergence shim layer, an access layer, etc., such as illustrated in FIG. 1 and described herein.

MaaS communication traffic can be categorized based on their goal or intent and the most suitable path to meet the requirement of different categories (e.g., emergency communication, user traffic, fleet management, etc.) can be selected. The goal or intent of the MaaS communication traffic can be determined using one or more attributes of the MaaS communication traffic, information about a MaaS packet, or the content of the MaaS packets. Existing discovery methods may not be efficient to capture the dynamic context and also do not carry contents or metadata specific to MaaS communication needs.

Priority levels can be assigned to different categories of MaaS communication traffic. For example, a highest priority can be assigned to emergency communication, such as emergency request/response packet. Such traffic can maintain priority in terms of communication requirement as well as for MaaS asset scheduling. In one example, priority can be assigned in descending order for the packet categories as illustrated in Table 1 (where the scale for priority is from 0-10, with 10 as the highest priority). Emergency communication can include any communication regarding the safety of a user of the MaaS node or one or more others associated with or close to the MaaS node. In other examples, emergency communication can include any communication regarding the integrity of the MaaS service. User traffic can include user-requested traffic, such as navigation information or other non-emergency information or communication requested by a user. Fleet management can refer to guidance or applications controlling or communicating non-emergency control, schedule, or maintenance of a MaaS node or asset of or associated with a MaaS node.

TABLE 1

| MaaS Packet Category | Example Priority | Example MaaS Service Packet | Example End-to-end QoS Metrics (Low/Medium/High) |
|---|---|---|---|
| | | Priority | |
| Category 1 | 10 | Emergency request/response packet | Latency = Low, Reliability = High, Availability = High, Service Success rate = High |
| Category 2 | 9 | User service request/Response packet | Latency = Med, Reliability = High, Availability = High, Service Success rate = High |
| Category 3 | 8 | Fleet management/control Packet | Latency = Med, Reliability = High, Availability = High, Service Success rate = High |
| ... | ... | ... | ... |
| Category N | 1 | Periodic Update (location, battery/fuel status, etc.) | Latency = High, Reliability = Low/Med, Availability = Med, Service Success rate = Low Med |

In certain examples, reliability and service success rates can be tightly correlated. In some examples, reliability can indicate one-hop end-to-end metric, while service success rate can still be end-to-end metric over multi-hop communication path.

Multiple communication paths from a MaaS node, such as a vehicle or a component of a vehicle (e.g., a vehicle of a MaaS provider, such as a ride-share, taxi, delivery, fleet, or other mobility service provider, etc.), to a MaaS controller (e.g., a central MaaS controller) can be utilized to meet the hierarchical communication needs of the system. The communication paths can be direct communication link, through peer-peer relaying, via nearby passenger device in the proximity, or via connection through a satellite access including 5G satellite access network. Communication paths can be on single radio access technology (RAT) or multiple RATs.

The present inventors have recognized, among other things, systems and methods to provide continuous discovery of potential alternative or redundant communication paths at higher layers of a protocol stack (e.g., application or middleware layers, etc.), independent of a specific RAT. Further, connection loss on a communication path or link can be predicted, and redundant or alternative paths for transmission of original or repetition copy of various types of MaaS packet, packet category, or data based on an urgency or priority of the packets can be dynamically selected to optimize connectivity of specific categories of MaaS communication traffic.

Context awareness in a connectivity environment for a specific geographic areas or routes can be maintained at the MaaS controller and be used to recommend specific communication paths to vehicles traveling to those geographic areas. For example, if a vehicle is moving towards a long tunnel, the vehicle can discover and establish a link to the MaaS controller via multi-hop peer-to-peer opportunistic links before entering the long tunnel. Higher layers of a protocol stack, such as application or middleware layers, can select alternative paths for a MaaS packet or packet-category transmission through different RATs or with different number of hops. MaaS specific metadata including context information about the path selection can be determined and provided at the higher layers (e.g., the middleware layer) and passed to the lower layers to effectively execute decisions made at the higher layers, enabling higher-level-aware optimization of operations at the lower layers.

FIG. 1 illustrates example layers of a protocol stack 100, such as of a MaaS node, comprising higher and lower layers and selected modules across different layers to implement MaaS operations, including categorization, prioritization, and discovery techniques. Higher layers can include an application layer 102 (e.g., MaaS application layer) and a middleware layer 104 (e.g., middleware/facilities (M/F) layer). Lower layers can include layers below the higher layers, including a transport layer 106, a network layer 108, a multi-RAT convergence shim layer 110, and an access layer 112. Modules, as used herein, can include circuits implementing logic, or separately sets of instructions implemented by one or more processors or processing circuits, to perform actions of the modules as described.

A MaaS traffic analytics/prioritization (MTAP) module 120 (e.g., a prioritization circuit) can categorize different types of MaaS packets (e.g., messages, etc.) based on a goal or intent of the MaaS packet and assign priorities to the messages based on their communication need. In an example, the categories can include, or in certain examples consist of: (1) emergency communication; (2) user traffic (e.g., user-initiated traffic); and (3) fleet management. In an example, emergency communication, such as emergency response, etc., can be the most important of such categories and can receive priority over the others in times of connection loss. In other examples, user-initiated traffic can receive priority over fleet management. In other examples, one or more other categories can be used with different priorities.

The MTAP module 120 can coordinate with one or more MaaS applications to obtain an intent or purpose of specific MaaS application packets and desired quality-of-service (QoS) requirements. In an example, the application layer 102 can communicate with the middleware layer 104 using a service access point, such as a middleware-application service access point (FA-SAP) 130.

A discovery and context awareness (DCA) module 122 can collect and maintain information about a local dynamic environment, communication history, topology, and route context. For example, the DCA module 122 running at each MaaS-node (e.g., vehicle, etc.) can exchange frequent messages containing sensed information, perception, communication history with the neighboring MaaS-node, enabling continuous discovery of potential alternative or redundant communication paths (independent of specific RAT), road conditions, reachability to the MaaS controller via neighboring nodes, etc.

Static or semi-static context regarding connectivity environment (e.g., blockage of signal due to tunnel) in specific geo-areas or routes can be maintained at the MaaS controller. The MaaS controller can use such information to recommend specific communication path(s) or trigger multi-hop peer-to-peer link establishment (e.g., in case of a tunnel, etc.) to the vehicles heading to specific Geo-Areas.

A connection loss prediction (CLP) module 124 can predict (current or alternative) communication paths (e.g., communication links) loss in advance to select or switch to alternative communication path earlier, such as using a machine-learning or artificial-intelligence-based connection-loss prediction model. The CLP module 124 can coordinate with the MaaS controller to provide context information on the route associated with potential link loss. When the CLP module 124 predicts a loss of all or most communication paths, the MTAP module 120 can start buffering important but latency-insensitive MaaS packets during a predicted or detected connection loss period.

The MaaS controller can reside at an edge of a network or beyond in the cloud. In an example, MaaS communication traffic, such as MaaS communication packets, can be considered to be at the MaaS controller at the point at which the MaaS communication traffic reaches the edge, such as at a wide area network access point, etc. Hops, as used herein, typically refer to the use of MaaS nodes (e.g., peers, repeaters, etc.) to reach the nearest Maas connectivity infrastructure.

Latency-insensitive MaaS packets can include high latency packets, such as those indicated as high latency in Table 1. In other examples, latency-insensitive packets can include medium and high latency packets, such as those indicated as high or medium latency in Table 1.

A packet duplication and repetition (PDR) module 126 (e.g., a duplication circuit) can receive information, such as packets, from the one or more other modules and control duplication of such packets or information over one or more communication paths and repetition of each duplicated packet or information. For example, the PDR module 126 can receive information from the MTAP module 120, such as packet category, MaaS service QoS category, etc. The PDR module 126 can receive information from the DCA module 122, such as route context, alternative communication paths availability, etc. The PDR module 126 can receive information from the CLP module 124, such as a probability of connection loss through primary or alternate paths, in order to decide potential duplication of packet over one or more communication paths and repetition of each duplicate packet.

A redundant/alternative communication path selection (RACPS) module 128 can communicate with other modules of the protocol stack 100 to map original, duplicate, or repeated packets to primary or alternate communication paths of the lower layers. The RACPS module 128 can add metadata (e.g., MaaS connectivity-assistance information, etc.) to packets to enable application-aware treatment of packets at the lower layers, such as a transport layer 106, a network layer 108, or one or more other lower layers. In an example, the middleware layer 104 can be configured to communicate with the transport layer 106 or one or more other lower layers using a service access point, such as a transport-middleware service access point (TM-SAP) 134.

Metadata (e.g., MaaS connectivity-assistance information) from the middleware layer 104 can be used to develop customized selected operations of lower layers. For example, the transport layer 106 can use metadata to provide duplication or retransmission of packets, to coordinate flow control (e.g., treating a number of packets as a group if all packets of a group are required for a specific service, such as if MaaS end-to-end service experience jointly depends on a group of MaaS packets, etc.), to provide self-decodable segmentation, or to provide congestion control strategy at the lower layers. The network layer 108 can use metadata to select a next-hop forwarder (e.g., a vehicle). Other lower layers, such as a multi-RAT convergence shim layer 110, can use the metadata to select a suitable RAT. The access layer 112 can provide access to one or more RAT, such as LTE, 5G New Radio (NR), vehicle-to-everything (V2X), cellular-V2X (C-V2X), NR-V2X, direct link vehicle-to-infrastructure (V2I), peer-to-peer vehicle-to-vehicle (V2V), dedicated short range communication (DSRC), Wi-Fi, LoRa/LoRaWAN, satellite communication protocols, etc.

The control plane 114 (e.g., a management/control plane) can handle metadata exchange with MaaS packets between layers of the stack. In an example, the control plane 114 can communicate with the middleware layer 104 using a service access point, such as a management-middleware service access point (MM-SAP) 132.

Figure 2:
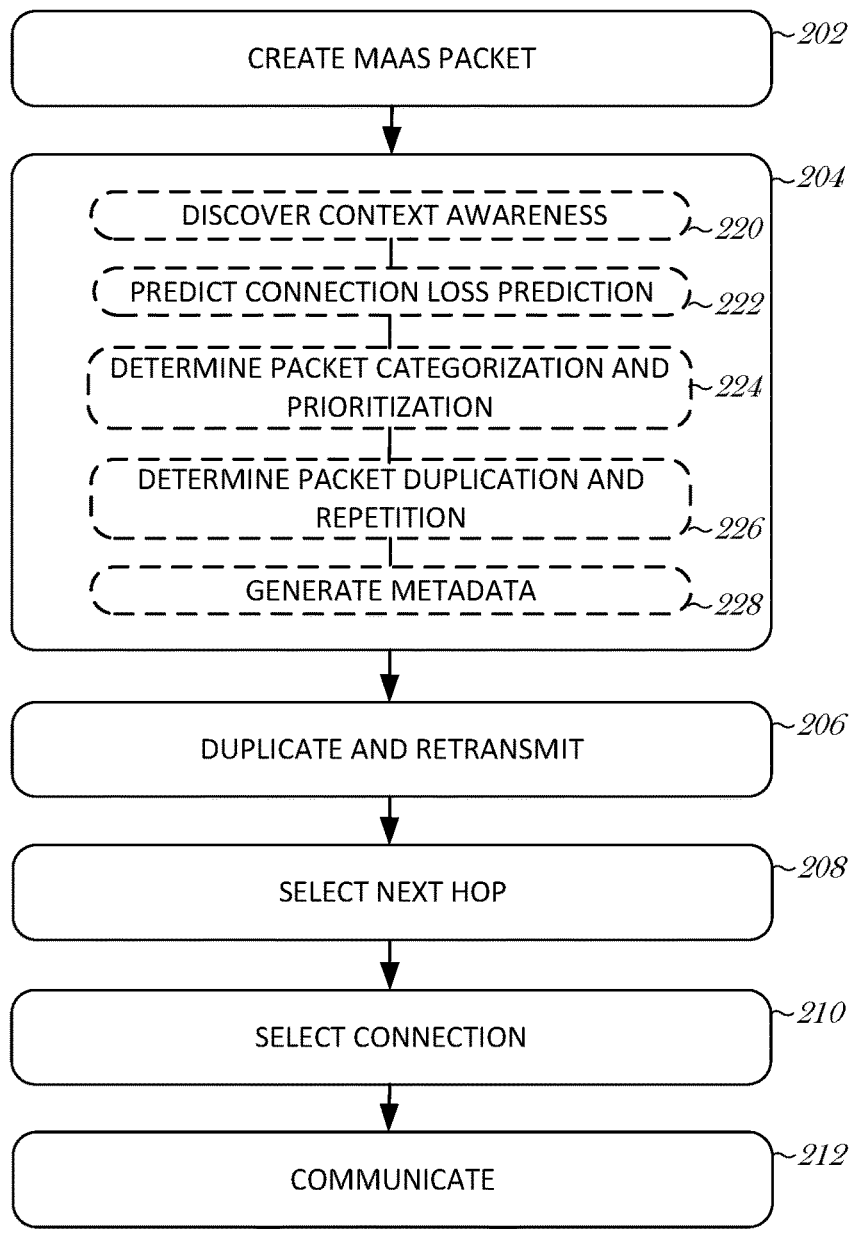
FIG. 2 illustrates example operations and corresponding layers of the protocol stack where such operations occur.

FIG. 2 illustrates example operations 200 and corresponding layers of the protocol stack of FIG. 1 where such operations occur. To prioritize MaaS communication traffic based on a goal or intent of the traffic, such goals or intents must be known. In an example, goals or intents can include, among others, emergency communication (e.g., emergency request or response), user traffic (e.g., user-requested traffic, such as a service request, etc.), fleet management (e.g., fleet scheduling assignment), etc.

At operation 202, MaaS service packet attributes of a MaaS packet can be determined and assigned, such as by the application layer 102 using information from the middleware layer 104. In an example, the intent or purpose of the packet can be extracted or determined. In addition, one or more of a quality-of-environment (QoE) or quality-of-service (QoS) parameter can be mapped to the packet, and similar packets, such as packets associated with each other or having some order, can be determined and assigned. Example QoS requirements of the packet can include service level end-to-end latency, end-to-end reliability, end-to-end service success rate, etc.

At operation 204, middleware services can be provided to the packet according to determined service packet attributes. In an example, the application layer 102 can provide the packet and service packet attributes to the middleware layer 104 at a packet originating node or vehicle. The middleware layer 104 can add such information to the middleware header so such information is available to the middleware at the intermediate forwarding nodes or vehicles. Once received, one or more operations can be provided.

At operation 220, discovery and context awareness (DCA) can be performed periodically or on-demand by a DCA module, such as the DCA module 122 of FIG. 1, to collect and maintain information about a local dynamic environment, communication history, communication capabilities (e.g., one or more RAT supported at neighboring MaaS-nodes), network topology, compute capabilities, various first or last mile alternative services, payment supports (e.g., micropayment capable or not), route contexts, etc. DCA can be performed with respect to a specific RAT (e.g., a preferred RAT, a RAT with the lowest packet failure, highest bandwidth, lowest number of hops, etc.), or independent of a specific RAT (e.g., polling all RATs, etc.). An example DCA message (DCAM) can include some or all of the information in Table 2.

TABLE 2

Example DCAM information

| Management Information Container-Information about DCAM | |
|---|---|
| DCAM Sequence Number (SN) | |
| Timestamp | |
| This-DCAM-Segment-Num | Present if DCAM is segmented |
| Total-CDM-Segments | Present if DCAM is segmented |
| DCAM Type | Full DCAM, Incremental or Differential DCAM |

TABLE 2-continued

Example DCAM information

| Periodic-ET | Periodic or Event Triggered |
|---|---|
| DCAM Originating Node Information Container-Node Information | |
| Node-Id | |
| Node-location | |
| Node-Speed | |
| Node-Direction | |
| Battery or Fuel Status | |
| Node-Type | MaaS-node at vehicle, mobile device, animal-collar (e.g. donkey, horse, camel, etc. for last mile pleasure trip, etc.) |
| Node-SubType | Type of Vehicle (e.g., Car, SUV, Bus, e-Rikshaw, etc.) |
| Perceived Environment Information Container | |
| List of Perceived Objects and their attributes | Obstacles on road e.g., fallen tree, tree branch, rock, etc.); Attributes (e.g., size, dimension, mobile or static, location, etc.) |
| List of Perceived Structures and their attributes | Static structure (e.g., tunnel, parking facility, charging facility, etc.); Attributes (e.g., size or dimension, location, accepted payment types, current availabilities, etc.) This info is also shared to MaaS Center |
| List of Perceived Situation and their attributes | Situations (e.g., traffic congestion, accident, events (e.g., forest fire, pollution level, etc.), etc.); Attributes (e.g., associated geo-area, latest time of perception, etc.) |
| Perceived Connectivity Environment and Communication Capabilities | |
| List of RATs supported | C-V2X, NR-V2X, Wi-Fi, DSRC, etc. |
| Node-Connectivity Levels | Number of neighbors with active connections |
| Connection Quality with Selected Neighbors on different RATs | Connection quality indicators for say selected best neighbors on various RATs |
| Hops to Reach Nearest MaaS-Connectivity Infrastructure (MaaS Edge/RSU/Hotspot) | |
| Communication-Path Details to Reach Nearest MaaS-Connectivity Infrastructure | Number of hops to nearest MaaS-connectivity infrastructure; RAT info on each hop; link quality in each Hop; etc. |
| Nearest MaaS-Connectivity Infrastructure (MaaS Edge/RSU/Hotspot) ID | |
| Nearest MaaS-Connectivity Infrastructure (MaaS Edge/RSU/Hotspot) Location | |
| Periodicity of DCAM | Periodicity of full (and incremental) DCAM |
| DCAM RATs | List of RATs on which node transmitting DCAM |
| List of Volunteer Passenger devices for forwarding | List of detected passenger devices which have been registered to provide relaying/forwarding specific MaaS communication traffic categories (e.g., emergency request/response) User profile will maintain information about volunteer passenger devices for such a service |
| Sensing Capability Info Container | |
| List of Sensors and their Attributes | List of sensors present at node and their attributes |
| First/Last Mile Alternative Services Availability | |
| List of First Last Mile Alternative MaaS-Service | Various first or last mile alternative MaaS-services available in a geo-area or route beyond road network (e.g., e-rikshaw, animal-transport, bike, etc.); information about payment-accepted by these services This info is also shared to MaaS Center |

Nodes periodically share a DCAM with neighbors (usually within 1-hop). In an example, to reduce the communication overhead, a full DCAM (F-DCAM) can be transmitted with a longer periodicity, while a differential or incremental DCAM (I-DCAM) can be transmitted with shorter periodicity between F-DCAMs. An I-DCAM carries less information than an F-DCAM. In an example, an I-DCAM carries only dynamic information, such as changes in a perceived environment beyond a given threshold, such as with respect to a previous F-DCAM. The I-DCAM can carry a reference to the previous F-DCAM, such as sequence number, a time stamp, etc. In an example, the periodicity of an I-DCAM can be selected as a sub-integer multiple of the periodicity of an F-DCAM. In other examples, multiple I-DCAMs can occur between successive F-DCAM. In other examples, the periodicity or order can be interrupted by request.

Figure 3:
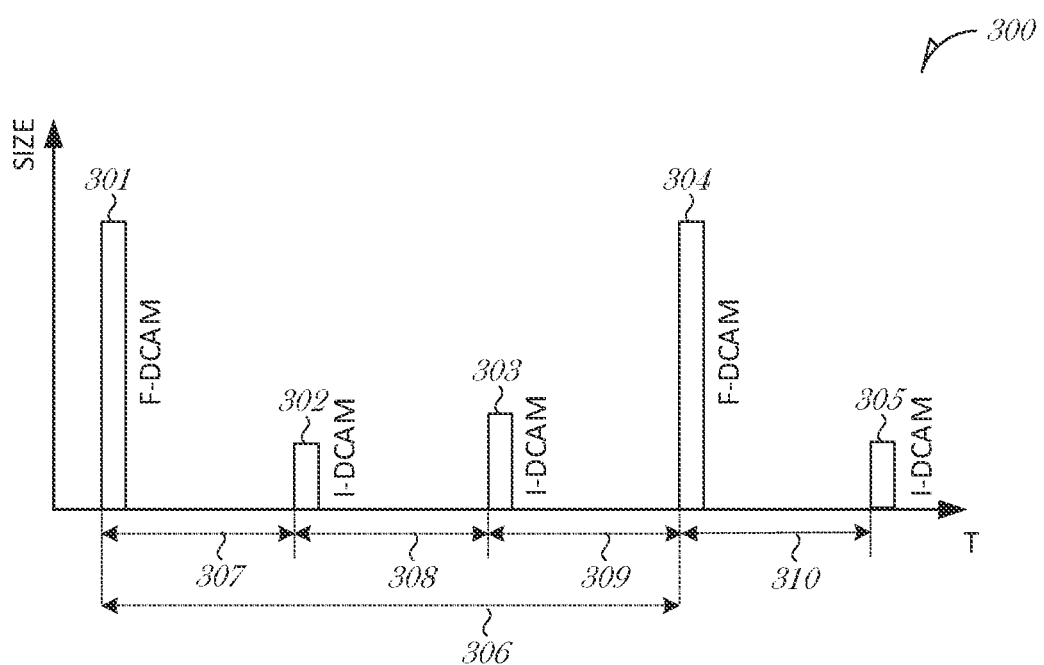
FIG. 3 illustrates example discovery and context awareness message transmissions.

FIG. 3 illustrates example discovery and context awareness (DCA) messages (DCAMs) 300 such as described above, including a first F-DCAM 301 transmit, such as by a MaaS node, at a first time and a second F-DCAM 304 transmit at a second time, a full transmission period 306 after the first F-DCAM 301. Between the first and second F-DCAMs 301, 304, first and second I-DCAMs 302, 303 are transmitted, such as by the MaaS node, at sub-integer periods 307, 308, 309 of the full transmission period 306. A third I-DCAM 305 follows a sub-integer period 310 after the second F-DCAM 304. The I-DCAMs have a smaller message size than the F-DCAMs. In an example, the message size of the second I-DCAM 303 can be larger than the first I-DCAM 302, for example, having reference to the first F-DCAM 301 and the first I-DCAM 302. In other examples, the first and second I-DCAMs 302, 303 can have the same message size. Although illustrated herein with two I-DCAMs between F-DCAMs, in other examples, other numbers (integers) or periods can be applied.

In certain examples, multi-hop discovery can be initiated, such as if a MaaS controller informs a vehicle about approaching a long tunnel with a potential connection loss. In such examples, selected first-hop neighbors of a MaaS node (e.g., the MaaS node originating the DCAM) can forward part of or all content of DCAM to the next hop. In certain examples, DCAM messages can be forwarded beyond the next hop.

In an example, a DCAM forwarder for each node can be selected in advance such as neighbors with highest node-connectivity levels. Forwarder ID can then be included in the DCAM header. In another embodiment, all neighbors receiving DCAM selects a random timer and neighbor whose timer expires first, forwards the DCAM to next-hop while others suppress forwarding on reception of a forwarded DCAM. The maximum number of hops for forwarding can be specified by originating node in the DCAM header.

To reduce the impact of multi-hop discovery, the message size of multi-hop discovery can be reduced to include only selected content. In an example, only content related to finding potential multi-hop communication paths to a MaaS-connectivity infrastructure or a MaaS controller is forwarded beyond 1-hop.

In certain examples, a DCAM may be transmitted over more than one RAT to make it robust of one or more radio failure. Exchanging a DCAM enables continuous discovery of potential alternative/redundant communication paths (independent of a specific RAT), road conditions, reachability to MaaS controller via neighboring nodes, neighbors' capabilities in terms of compute/communicate/payment, etc. Redundant communication paths may be either on the same RAT or a different RAT. Based on information collected from the DCA module, a MaaS node can maintain one or more potential forwarders or relays to reach the MaaS controller, as a redundant communication path or an alternative communication path in case of current path failure.

The DCA module can report the perception of a static or semi-static context, such as a connectivity environment (e.g., blockage of signal due to tunnel) in specific geo-areas or routes, various first or last mile alternative services in specific geo-areas, etc. The MaaS controller can maintain static or semi-static context regarding the connectivity environment in specific geo-areas or routes in a geo-area or route specific context profile.

At 222, connection loss prediction (CLP) can be performed by a CLP module, such as the CLP module 124 of FIG. 1. The MaaS controller can use information stored in the geo-area or route specific context profile to recommend specific communication paths to vehicles heading in these geo-areas or routes. For example, if a long tunnel approaching is informed to a vehicle, the CLP module can initiate multi-hop DCA to establish a link to a MaaS controller via multi-hop peer-to-peer opportunistic links using the dynamic context collected by the DCA module.

At 224, packet categorization and prioritization can be determined by a MaaS traffic analytics/prioritization (MTAP) module, such as the MTAP module 120 of FIG. 1. At 226, packet duplication and repetition can be determined by a packet duplication and repetition (PDR) module, such as the PDR module 126 of FIG. 1.

At 228, metadata (e.g., MaaS connectivity assistance information) can be generated and added to the packet or to a field in the packet header by a redundant/alternative communication path selection (RACPS) module, such as the RACPS module 128 of FIG. 1. The RACPS module can receive input from the MTAP module, the DCA module, the CLP module, and the PDR module to map the packet (original, duplicate or repetition packets) to one or more primary or alternate communication paths and enable MaaS application-aware treatment of MaaS packets at the lower layers. In certain examples, metadata exchange with MaaS packets between layers may also be handled by the control plane 114. Example metadata can include some or all of the information in Table 3.

TABLE 3

| \ | Metadata content |
|---|---|
| MaaS Packet intent/purpose | For example: emergency response; user traffic; fleet management; etc. |
| MaaS packet category | For example: high (e.g., emergency request, or emergency request and user traffic); medium (e.g., user traffic); low (e.g., fleet management) |
| MaaS packet utility/importance score. | Importance level of each packet It can be useful if some packets need to be dropped/delayed at lower layer, e.g., due to congestion |
| QoS requirements | For example: latency; reliability; success rate, etc. |
| Service Association Information | Service Association Information for coordinated flow control (e.g., treating associated packets as a dependent group at lower layers) In some scenario, end-to-end MaaS service performance depends on a group of MaaS packets (e.g., on-demand vehicle scheduling requests from several users for the same route can be associated |
| Communication Path-selection assistance Information | Communication path-selection assistance Info-targeted for the network layer For example, recommended Communication-Path (or ranking) for a packet copy (original, duplicate |

TABLE 3-continued

| Metadata content | |
|---|---|
| | copy) |
| | Node IDs based on discovery information collected by the DCA module |
| | Geo-location of destination (say nearest MaaS-Edge/RSU) of the packet |
| Connectivity (such as RAT) selection assistance Information | Connectivity (such as RAT) selection assistance information |
| | For example, recommended RAT (or ranking of available RATs) for each hop for selected communication-path for a packet copy (original, duplicate copy) |
| Planned Duplication/Repetition at Middleware | Information about MaaS packet duplication and repetition applied to a MaaS packet at the Middleware |

At operation 206, MaaS service requirements can be optimized by a transport layer, such as the transport layer 106 of FIG. 1, using MaaS connectivity assistance information. For example, the transport layer can perform one or more of packet control, flow management, latency reduction, packet dropping, and reliability operations using MaaS connectivity assistance information, such as based on a goal or intent of the MaaS packet (e.g., emergency communication, user traffic, fleet management, etc.), a MaaS packet category, a packet utility or importance marking, a MaaS QoS requirement, or packet duplication or repetition information, such as determined or assigned in the middleware layers 104 and described above.

In an example, QoS requirements can be used to decide repetitions versus retransmissions (repetition for packet with stringent latency constraint). Moreover, if the transport layer has information about packet duplication and repetition at the middleware layers 104, such information along with transport layer information (e.g., a current congestion level, other packets of various priorities in buffer for transmission, etc.) can be used to effectively customize a number of repetitions or retransmission at the transport layer. For example, if the current congestion level at the transport layer is above a threshold and the MaaS packet category or priority is not high or the packet utility or importance marking is not high, repetition or retransmission may be skipped or reduced.

In an example, several MaaS packets can be associated with each other, impacting the overall MaaS service performance. For example, on-demand vehicle scheduling requests from several users for the same route can be associated. If the middleware layers 104 can identify such association and add association ID for these packets, the transport layer can provide coordinated flow control (e.g., treating these associated packets as a dependent group) during congestion and flow control. For example, the transport layer can prioritize first transmission of all these packets before repetition of any. In other examples, the goal or intent of the MaaS packet, as well as any utility or importance markings, can be used as the basis for dropping packets during times of congestion or low connectivity.

At operation 208, a next hop can be selected using a network layer, such as the network layer 108 of FIG. 1. The middleware layers can provide communication path-selection assistance information in metadata to the network layer to assist in determination or selection of the next hop. For example, metadata can provide a recommended path or a ranking of available communication paths, such as received from the DCA module or from the MaaS controller through the CLP module, etc. Such recommendations can differ for original and duplicate MaaS packets. The metadata can include MaaS node IDs of nodes or vehicles on the communication path based on discovery information collected by DCA module at the middleware layer. The network layer can use metadata to determine a next-hop node for each MaaS packet. In certain examples, the metadata can provide a destination location or a geo-area of the MaaS packet, so that network layer can use the destination location or the geo-area to determine next-hop peer-to-peer communication node.

In some embodiments, MaaS packets at an intermediate node may need to be forwarded to the middleware layer for efficient operation of packet forwarding. In an example, a flag can be added in the network layer packet header indicating MaaS packets to be forwarded to the middleware layer before forwarding to the next hop node. The middleware layer can update the metadata in real-time based on latest discovery information.

At operation 210, a connection can be selected using a multi-RAT convergence shim layer, such as the Multi-RAT convergence shim layer 110 of FIG. 1. The metadata can include communication path selection assistance information to assist the Multi-RAT convergence shim layer to determine the RAT for the next-hop or other transmissions. The metadata can provide a recommendation for each hop for a selected communication path for a MaaS packet, either an original or a duplicate copy. At operation 212, the packet can be communicated using the selected RAT of the access layer, such as the access layer 112 of FIG. 1.

In an example, the MaaS controller or a CLP module of a MaaS node can predict that all or most communication paths in a geo-area or a specific route associated with one or more MaaS nodes. When a CLP module indicates prediction of all or most communication paths loss to the MAP module, the MTAP module can start marking important MaaS packets to buffer during connection loss period if such packets are not latency sensitive. The Maas controller (e.g., an edge or cloud device) can provide connectivity context related to the route or geo-area to predict a connection loss duration. Connection-loss duration can be used to select buffering of packets that can tolerate the expected delay at least equal to connection loss duration and are of high importance.

Identifying packets of high importance can help other layers selectively buffer such packets for longer periods. The middleware layers can coordinate with the transport layer to receive explicit notification of successful transmission of packets identified with high importance to clear successfully transmitted packets from the buffer. MaaS packets marked with high importance can also be provided to the PDR module and the RACPS module to set or determine repetition and alternative communication routes. If, after a period of no connectivity, a communication channel with a lower bandwidth becomes available, buffered packets marked with high importance can receive priority, or the number of duplications or repetitions of categories marked with lower importance can be reduced.

In an example, alternate and redundant communication paths can be used to maintain available and reliable connectivity. For example, when a MaaS node is approaching a known geo-area of limited or no connectivity, alternatives can be sought and planned for in advance of connection loss.

For example, when a CLP module, such as in concert with a MaaS controller, predicts that the MaaS node is approaching a long tunnel, the MaaS controller can provide information about the approaching tunnel to the DCA module of the MaaS node (e.g., node A). In an example, the DCA module can seek to establish a redundant or alternative communication path, including, for example, an alternative single- or multi-hop peer-to-peer communication path. One or more relays can be sought and accepted, in certain examples, having a lower bandwidth or higher cost or latency than would otherwise be acceptable.

In an example, one or more relays (including multi-hop relays) can be selected in such a way that one relay or forwarder (e.g., relay/forwarder R), forwarding information or data to the MaaS controller on behalf of node A, remains outside of the tunnel for the duration that node A is in the tunnel. In an automated fleet example, one fleet vehicle or asset can be instructed, such as by the MaaS controller, to remain outside of the tunnel for the benefit of the fleet, while other fleet vehicles are in the tunnel. In other examples, a first relay or forwarder can be selected behind node A at the time of entering the tunnel, and a second relay or forwarder can be selected ahead of node A as the node A proceeds towards the exit of the tunnel (e.g., after the midpoint, near the exit, etc.). Although discussed and illustrated herein as a tunnel, in other examples, other coverage outages, impediments, temporary or permanent service outages can be managed in the same or similar manner.

Figure 4A:
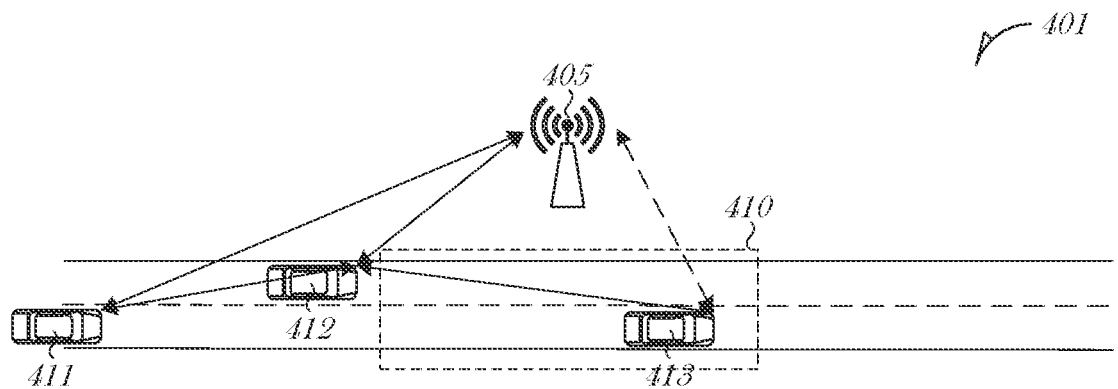
FIGS. 4A-C illustrate first, second, and third nodes approaching and traveling through a tunnel while maintaining connectivity to a network at three different times.
Figure 4B:
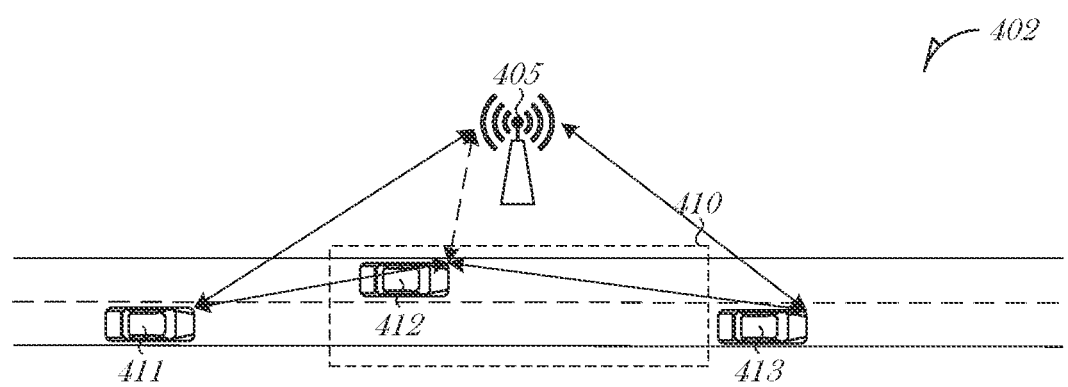
Figure 4C:
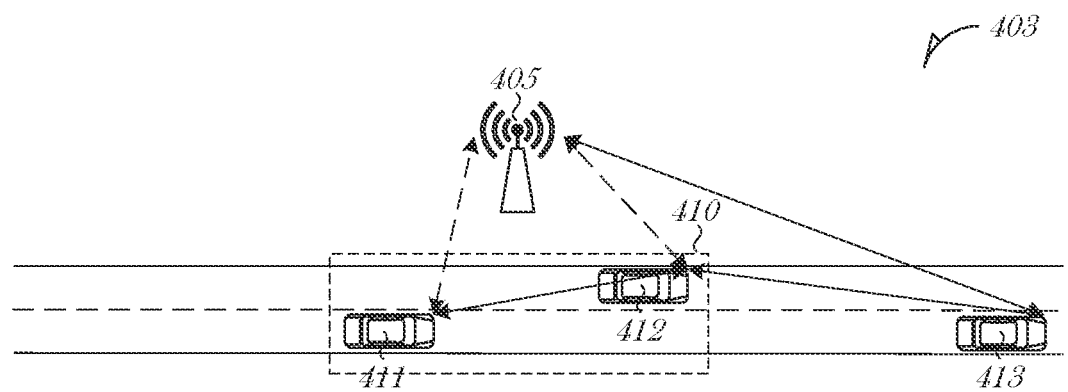

FIGS. 4A-C illustrate first, second, and third MaaS nodes (e.g., vehicles) 411, 412, 413 approaching and traveling through a tunnel 410 while maintaining connectivity to a network 405 at three different times 401, 402, 403. In FIG. 4A, a DCA modules of the first and second MaaS nodes 411, 412 can predict a future outage approaching the tunnel 410 and seek to establish redundant or alternative communication paths. The third MaaS node 413 has lost a direct connection to the network 405, but has maintained a single-hop path through the second MaaS node 412.

In FIG. 4B, the second MaaS node 412 has lost a direct connection to the network, but has first and second single-hop paths through the first and third MaaS nodes 411, 413, respectively. In FIG. 4C, the first and second MaaS nodes 411, 412 have lost direct connection to the network, but maintain a path through the third MaaS node 413, a single-hop path for the second MaaS node 412, and a multi-hop path for the first MaaS node 411.

In an example, while each of the MaaS nodes have a direct connection to the network 405, traffic of any priority can be provided to the network 405. When the connection to the network 405 for a respective MaaS node comprises a hop through another MaaS node, traffic through the other nodes can be limited to only high priority traffic.

On-demand multi-hop discovery can be initiated for context aware discovery expansion once coverage-loss geo-areas or impediments are known to the DCA and accordingly the MaaS controller. For example, if continuous discovery sends a DCAM to only one-hop neighbors, an on-demand discovery coverage expansion can be initiated to a few hops. Accordingly, geo-area scoped multi-hop discovery can be triggered where neighbors forward DCAM up to a limited number of hops or through a specific geo-area. If regular DCAM exchange is performed on only one RAT, this on-demand discovery coverage expansion can be expanded to multiple RATs to make discovery more robust (e.g., peer-to-peer communication can be on different RATs).

In other examples, similar discovery can be initiated for other temporary or permanent outages, or when traveling through different coverage areas where one node may have access to other RATs or other providers. In certain examples, authentication or authorization for such discovery and sharing can be controlled or negotiated by the MaaS controller.

In certain examples, passenger devices, such as mobile devices of passengers traveling in MaaS vehicles, etc., can have different radios or different operators for same the same type of radio (assuming different operators may have different levels of infrastructure present in different geo-areas), providing a diverse path for relaying or forwarding services for specific MaaS communication traffic categories (e.g., emergency request/response, etc.). Passenger devices can be discoverable by a DCA module at a MaaS Node. A user profile at a MaaS controller can maintain information about volunteer passenger devices for such a service. In other examples, the passenger devices can maintain permissions, such as through an application associated with the MaaS node or service, and can be used as relays or forwarders for on-demand, opportunistic, or urgent communication needs.

In one example, information about communication path can be collected from the passenger device, and the passenger device can be initiated on-demand by evoking on-demand discovery in specific cases. For example, when a CLP module predicts loss of a primary communication path the RACPS module has not found an alternate peer-to-peer path based on communication network topology information in the DCA module, a volunteer passenger device may allow devices to join. In certain examples, the passenger device communication path may be limited to only emergency communication.

Figure 5:
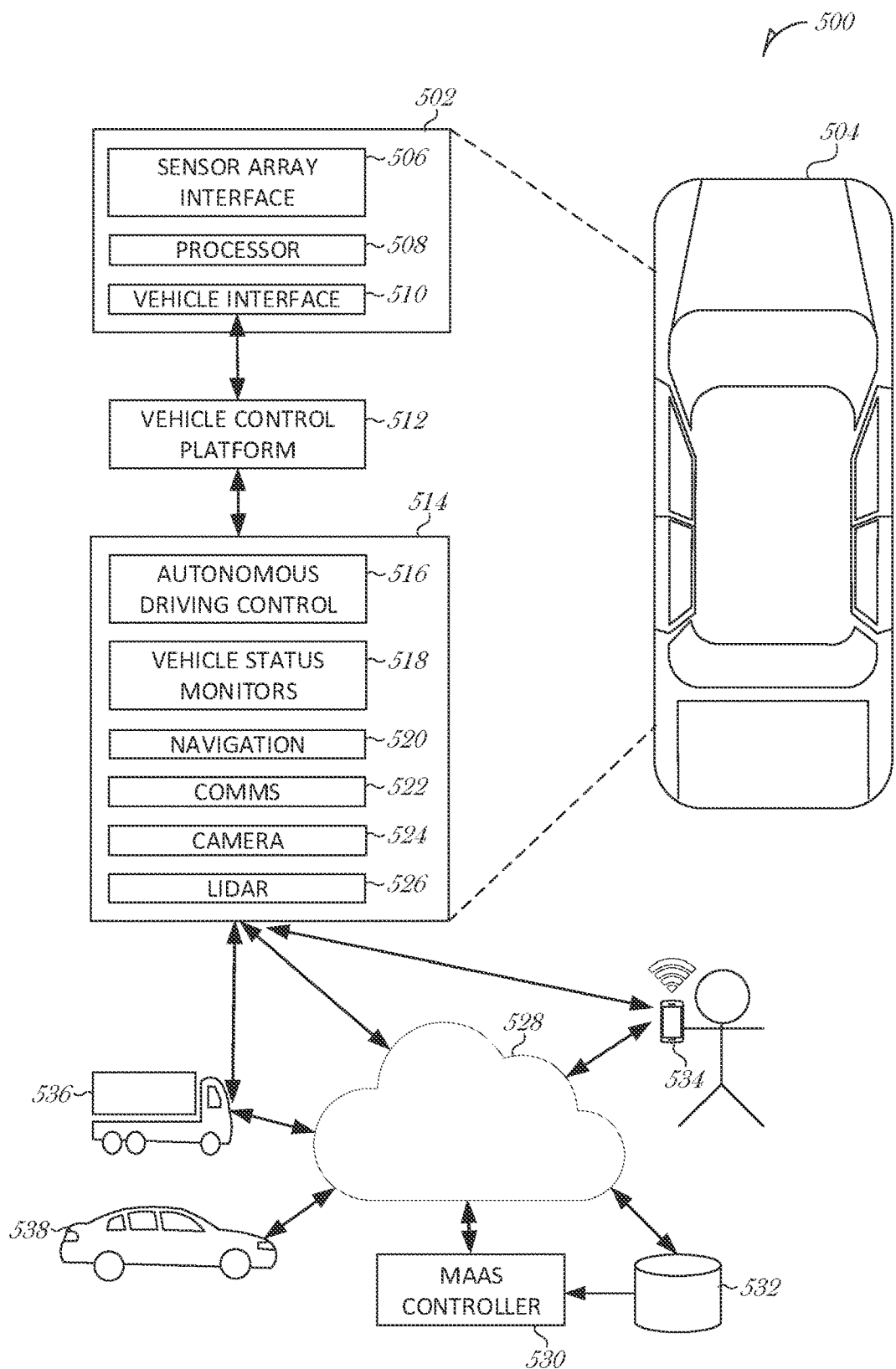
FIG. 5 illustrates an example system to process data to provide improved interactions with the surrounding operating environment.

FIG. 5 illustrates an example system 500 to process data to provide improved interactions with the surrounding operating environment. FIG. 5 includes a processing platform 502 incorporated into a vehicle 504. The processing platform 502 includes a sensor array interface 506, a processor 508, and a vehicle interface 510.

The vehicle 504, or a component of the vehicle 504, can be considered a MaaS node. The vehicle 504 can be any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 504 may operate in a manual mode where the driver operates the vehicle 504 conventionally using pedals, a steering wheel, or other controls. At other times, the vehicle 504 may operate in a fully autonomous mode, where the vehicle 504 operates without user intervention. In addition, the vehicle 504 may operate in a semi-autonomous mode, where the vehicle 504 controls many of the aspects of driving, but the driver may intervene or influence the operation using conventional (e.g., steering wheel) and non-conventional inputs (e.g., voice control).

The sensor array interface 506 may be used to provide input or output signaling to the processing platform 502 from one or more sensors of a sensor array installed on the vehicle 504. Examples of sensors include, but are not limited to microphones; forward, side, or rearward facing cameras; radar; LiDAR; ultrasonic distance measurement sensors; or other sensors. Forward-facing or front-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. Side-facing sensors can be directed outward from the sides of the vehicle 504.

The vehicle 504 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, etc.

Sensor data can be used in various contexts, such as to determine vehicle operation, environmental information, road conditions, travel conditions, or the like. The sensor array interface 506 may communicate with another interface, such as an onboard navigation system, of the vehicle 504 to provide or obtain sensor data. Components of the processing platform 502 may communicate with components internal to the processing platform 502 or components that are external to the processing platform 502 using a network 528, which may include local-area networks (LAN), wide-area networks (WAN), wireless networks (e.g., 802.11 or cellular network), ad hoc networks, personal area networks (e.g., Bluetooth), vehicle-based networks (e.g., Controller Area Network (CAN) BUS), or other combinations or permutations of network protocols and network types. The network 528 may include a single local area network (LAN) or wide-area network (WAN), or combinations of LANs or WANs, such as the Internet. The various devices coupled to the network may be coupled to the network via one or more wired or wireless connections.

The processing platform 502 may communicate with a vehicle control platform 512. The vehicle control platform 512 may be a component of a larger architecture that controls various aspects of the vehicle 504. The vehicle control platform 512 may have interfaces to other vehicle platforms or subsystems 514, such as autonomous driving control systems 516 (e.g., steering, braking, acceleration, etc.), vehicle status monitors 518 (e.g., tire pressure monitor, oil level sensor, speedometer, etc.), comfort systems (e.g., heat, air conditioning, seat positioning, etc.), navigation systems 520 (e.g., maps and routing systems, positioning systems, etc.), collision avoidance systems, communication systems 522 (e.g., such as implementing a communication protocol, including MaaS communication, etc.), security systems, sensors (e.g., a camera 524, LiDAR 526, GPS, etc.), etc. Using the processing platform 502, the vehicle control platform 512 may control one or more subsystems.

The network 528 is further coupled to a MaaS controller 530. In an example, the network 528 can couple the vehicle 504 or one or more of the other vehicle platforms or subsystems 514. In other examples, the MaaS controller 530 can reside in the network 528. One or more of the network 528 or the MaaS controller 530 can be coupled to or include one or more databases 532, such as to store information from one or more components of the system 500.

In addition to the vehicle 504, the system 500 includes additional MaaS nodes including a user device 534, a commercial vehicle 536, and a second vehicle 538. Each MaaS node can be coupled to the network 528 and in certain examples, to each other. When a direct connection path between one or more of the MaaS nodes and the network 528 fails, connection can be restored through one or more additional MaaS devices. For example, the vehicle 504 can be coupled to the network 528 through one or more of the user device 534, the commercial vehicle 536, or the second vehicle 538.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 6:
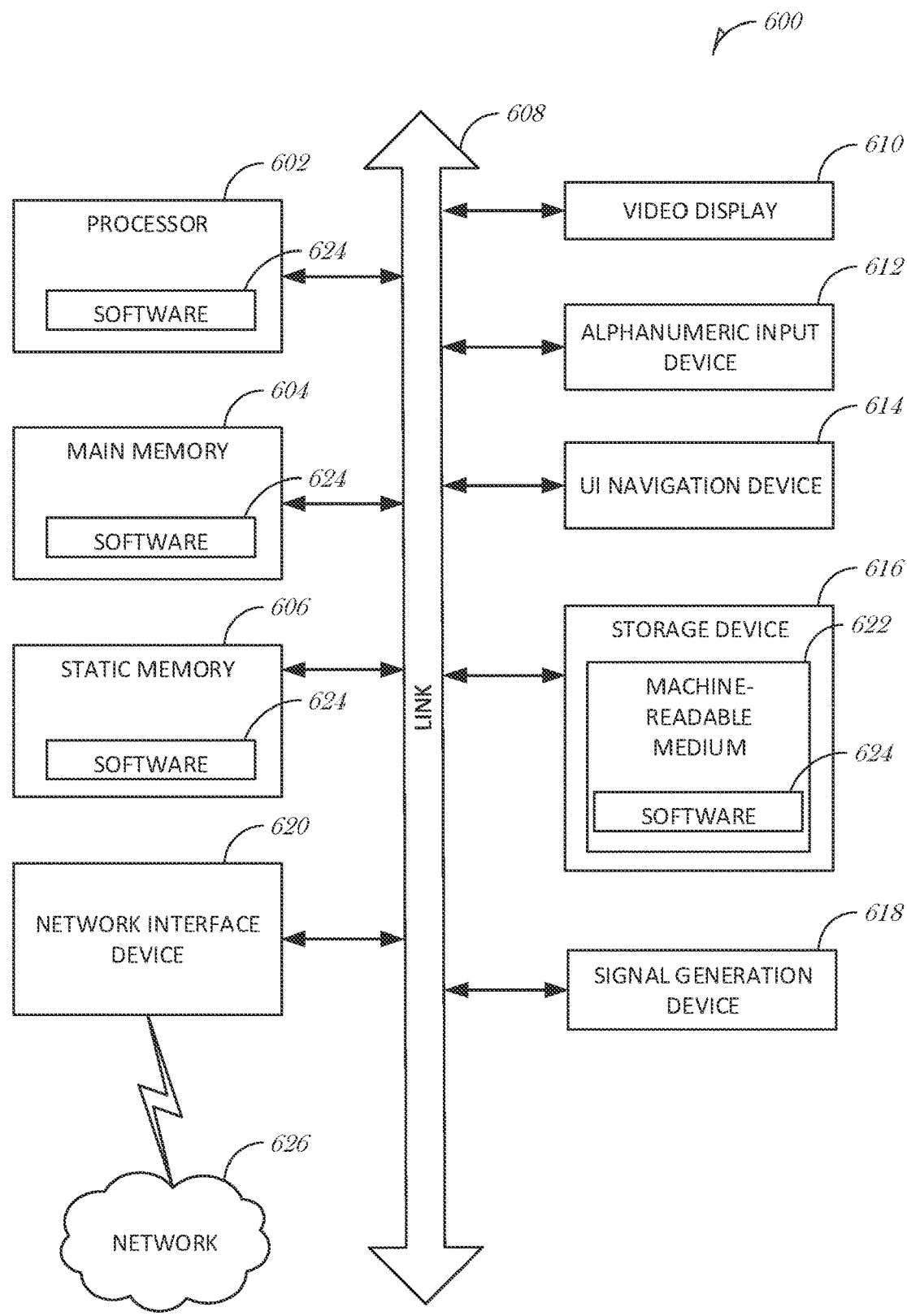
FIG. 6 illustrates an example machine in the form of a computer system, within which a set or sequence of instructions may be executed to cause the machine to perform any one of the methodologies discussed herein.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 6 illustrates an example machine in the form of a computer system 600, within which a set or sequence of instructions may be executed to cause the machine to perform any one of the methodologies discussed herein. In alternative embodiments, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices, magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, LoRa/LoRaWAN, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

Example 1 is a system comprising: a prioritization circuit configured to categorize MaaS communication traffic of a MaaS node into different levels of priority at a protocol layer below a MaaS application layer of a protocol stack and above a communication layer of the protocol stack; and a duplication circuit configured to control duplication or repetition of the MaaS communication traffic using the categorized level of priority of the MaaS communication traffic.

In Example 2, the subject matter of Example 1 includes, a discovery circuit configured to monitor a communication path of the MaaS node, to determine an alternative communication pathway for the MaaS node, and to limit traffic on alternative communication pathways to high level priority MaaS communication traffic.

In Example 3, the subject matter of Examples 1-2 includes, a discovery circuit configured to configured to monitor a communication path of the MaaS node and to determine an alternative communication pathway for the MaaS node, wherein the discovery circuit is configured to limit traffic on the alternative communication pathway when the alternative communication pathway comprises at least one hop through another MaaS node between the MaaS node and the MaaS controller.

In Example 4, the subject matter of Examples 1-3 includes, a connection loss prediction circuit configured to receive location information of the MaaS node, to receive information from a MaaS controller at or beyond a communication path of the MaaS node, and to predict a loss of the communication path of the MaaS node using the received location information and the received information from the MaaS controller.

In Example 5, the subject matter of Example 4 includes, wherein the connection loss prediction circuit is configured to trigger an increase in buffering of latency-insensitive MaaS communication traffic in response to a predicted loss of the communication path of the MaaS node, in contrast to that prior to the predicted loss.

In Example 6, the subject matter of Examples 1-5 includes, a communication path selection circuit configured to add metadata to the MaaS communication traffic, the metadata comprising information about the levels of priority; and a communication circuit at an access layer of the protocol stack configured to select a radio access technology to communicate the MaaS communication traffic to a MaaS controller using the metadata of the MaaS communication traffic.

In Example 7, the subject matter of Examples 1-6 includes, wherein the MaaS communication traffic comprises MaaS communication packets, and wherein the prioritization circuit is configured to categorize each respective MaaS communication packet using information about the respective MaaS communication packets.

In Example 8, the subject matter of Examples 1-7 includes, wherein the different levels of priority comprise at least a high level priority and a low level priority, wherein the high level priority MaaS communication traffic comprises emergency communication traffic, wherein the duplication circuit is configured to increase duplication or repetition of high level priority MaaS communication traffic with respect to low level priority MaaS communication traffic.

In Example 9, the subject matter of Example 8 includes, wherein the MaaS communication traffic comprises emergency communication, user traffic, and fleet management traffic, wherein the prioritization circuit is configured to categorize the emergency communication as a high level priority, the user traffic as a medium level priority, and the fleet management traffic a low level priority using information about the MaaS communication traffic, and wherein the duplication circuit is configured to weight duplication or repetition of high level priority MaaS communication traffic more than medium level priority MaaS communication traffic, and medium level priority MaaS communication traffic more than low level priority MaaS communication traffic.

Example 10 is a method comprising: categorizing, using a prioritization circuit, MaaS communication traffic of a MaaS node into different levels of priority at a protocol layer below a MaaS application layer of a protocol stack and above a communication layer of the protocol stack; and controlling, using a duplication circuit, duplication or repetition of the MaaS communication traffic using the categorized level of priority of the MaaS communication traffic.

In Example 11, the subject matter of Example 10 includes, using a discovery circuit: monitoring a communication path of the MaaS node; determining an alternative communication pathway for the MaaS node; and limiting traffic on alternative communication pathways to high level priority MaaS communication traffic.

In Example 12, the subject matter of Examples 10-11 includes, using a discovery circuit: monitoring a communication path of the MaaS node; determining an alternative communication pathway for the MaaS node; and limiting traffic on the alternative communication pathway when the alternative communication pathway comprises multiple hops between the MaaS node and the MaaS controller.

In Example 13, the subject matter of Examples 10-12 includes, using a connection loss prediction circuit: receiving location information of the MaaS node; receiving information from a MaaS controller at or beyond an edge of a communication path of the MaaS node; and predicting a loss of the communication path of the MaaS node using the received location information and the received information from the MaaS controller.

In Example 14, the subject matter of Example 13 includes, triggering an increase in buffering of latency-insensitive MaaS communication traffic in response to a predicted loss of the communication path of the MaaS node, in contrast to that prior to the predicted loss.

In Example 15, the subject matter of Examples 10-14 includes, adding metadata to the MaaS communication traffic, the metadata comprising information about the levels of priority; and selecting, using a communication circuit at an access layer of the protocol stack, a radio access technology to communicate the MaaS communication traffic to a MaaS controller using the metadata of the MaaS communication traffic.

In Example 16, the subject matter of Examples 10-15 includes, wherein the MaaS communication traffic comprises MaaS communication packets, and wherein categorizing MaaS communication traffic comprises categorizing each respective MaaS communication packet using information about the respective MaaS communication packets.

In Example 17, the subject matter of Examples 10-16 includes, wherein the different levels of priority comprise at least a high level priority and a low level priority, wherein the high level priority MaaS communication traffic comprises emergency communication traffic, wherein controlling duplication or repetition of the MaaS communication traffic comprises increasing duplication or repetition of high level priority MaaS communication traffic with respect to low level priority MaaS communication traffic.

In Example 18, the subject matter of Example 17 includes, wherein the MaaS communication traffic comprises emergency communication, user traffic, and fleet management traffic, wherein categorizing MaaS communication traffic comprises categorizing the emergency communication as a high level priority, the user traffic as a medium level priority, and the fleet management traffic a low level priority using information about the MaaS communication traffic, and wherein controlling duplication or repetition of the MaaS communication traffic comprises weighting duplication or repetition of high level priority MaaS communication traffic more than medium level priority MaaS communication traffic, and medium level priority MaaS communication traffic more than low level priority MaaS communication traffic.

Example 19 is at least one machine-readable medium including instructions for improving connectivity of a MaaS node, the instructions, when executed by a machine, cause the machine to perform operations comprising: categorizing MaaS communication traffic of a MaaS node into different levels of priority at a protocol layer below a MaaS application layer of a protocol stack and above a communication layer of the protocol stack; and controlling duplication or repetition of the MaaS communication traffic using the categorized level of priority of the MaaS communication traffic.

In Example 20, the subject matter of Example 19 includes, the operations comprising: monitoring a communication path of the MaaS node; determining an alternative communication pathway for the MaaS node; and limiting traffic on alternative communication pathways to high level priority MaaS communication traffic.

In Example 21, the subject matter of Examples 19-20 includes, the operations comprising: monitoring a communication path of the MaaS node; determining an alternative communication pathway for the MaaS node; and limiting traffic on the alternative communication pathway when the alternative communication pathway comprises multiple hops between the MaaS node and the MaaS controller.

In Example 22, the subject matter of Examples 19-21 includes, the operations comprising: receiving location information of the MaaS node; receiving information from a MaaS controller at or beyond an edge of a communication path of the MaaS node; and predicting a loss of the communication path of the MaaS node using the received location information and the received information from the MaaS controller.

In Example 23, the subject matter of Example 22 includes, the operations comprising: triggering an increase in buffering of latency-insensitive MaaS communication traffic in response to a predicted loss of the communication path of the MaaS node, in contrast to that prior to the predicted loss.

In Example 24, the subject matter of Examples 19-23 includes, the operations comprising: adding metadata to the MaaS communication traffic, the metadata comprising information about the levels of priority; and selecting, from an access layer of the protocol stack, a radio access technology to communicate the MaaS communication traffic to a MaaS controller using the metadata of the MaaS communication traffic.

In Example 25, the subject matter of Examples 19-24 includes, wherein the MaaS communication traffic comprises MaaS communication packets, and wherein categorizing MaaS communication traffic comprises categorizing each respective MaaS communication packet using information about the respective MaaS communication packets.

Example 26 is a system comprising means for: categorizing MaaS communication traffic of a MaaS node into different levels of priority at a protocol layer below a MaaS application layer of a protocol stack and above a communication layer of the protocol stack; and controlling duplication or repetition of the MaaS communication traffic using the categorized level of priority of the MaaS communication traffic.

In Example 27, the subject matter of Example 26 includes means for: monitoring a communication path of the MaaS node; determining an alternative communication pathway for the MaaS node: and limiting traffic on alternative communication pathways to high level priority MaaS communication traffic.

In Example 28, the subject matter of Examples 26-27 includes means for monitoring a communication path of the MaaS node; determining an alternative communication pathway for the MaaS node; and limiting traffic on the alternative communication pathway when the alternative communication pathway comprises multiple hops between the MaaS node and the MaaS controller.

In Example 29, the subject matter of Examples 26-28 includes means for receiving location information of the MaaS node; receiving information from a MaaS controller at or beyond an edge of a communication path of the MaaS node; and predicting a loss of the communication path of the MaaS node using the received location information and the received information from the MaaS controller.

In Example 30, the subject matter of Example 29 includes means for triggering an increase in buffering of latency-insensitive MaaS communication traffic in response to a predicted loss of the communication path of the MaaS node, in contrast to that prior to the predicted loss.

In Example 31, the subject matter of Examples 26-30 includes means for adding metadata to the MaaS communication traffic, the metadata comprising information about the levels of priority; and selecting, using a communication circuit at an access layer of the protocol stack, a radio access technology to communicate the MaaS communication traffic to a MaaS controller using the metadata of the MaaS communication traffic.

In Example 32, the subject matter of Examples 26-31 includes, wherein the MaaS communication traffic comprises MaaS communication packets between the MaaS node and a MaaS controller, and wherein means for categorizing MaaS communication traffic comprises means for categorizing each respective MaaS communication packet using information about the respective MaaS communication packets.

In Example 33, the subject matter of Examples 26-32 includes, wherein the different levels of priority comprise at least a high level priority and a low level priority, wherein the high level priority MaaS communication traffic comprises emergency communication traffic, and wherein the duplication circuit is configured to increase duplication or repetition of high level priority MaaS communication traffic with respect to low level priority MaaS communication traffic.

In Example 34, the subject matter of Example 33 includes, wherein the MaaS communication traffic comprises emergency communication, user traffic, and fleet management traffic, wherein the system comprises means for categorizing the emergency communication as a high level priority, the user traffic as a medium level priority, and the fleet management traffic a low level priority using information about the MaaS communication traffic, and wherein the system comprises means for weighting duplication or repetition of high level priority MaaS communication traffic more than medium level priority MaaS communication traffic, and medium level priority MaaS communication traffic more than low level priority MaaS communication traffic.

Example 35 is at least one machine-readable medium including instructions that, when executed by processing circuitry, cause the processing circuitry to perform operations to implement of any of Examples 1-34.

Example 36 is a system comprising: a prioritization circuit configured to categorize Mobility-as-a-Service (MaaS) communication traffic of a MaaS node into different levels of priority; and a duplication circuit configured to control duplication or repetition of the MaaS communication traffic using the categorized level of priority of the MaaS communication traffic.

In Example 37, the subject matter of Example 36 includes, a discovery circuit configured to monitor a communication path of the MaaS node, to determine an alternative communication pathway for the MaaS node, and to limit traffic on alternative communication pathways to high level priority MaaS communication traffic.

In Example 38, the subject matter of Examples 36-37 includes, a discovery circuit configured to configured to monitor a communication path of the MaaS node and to determine an alternative communication pathway for the MaaS node, wherein the discovery circuit is configured to limit traffic on the alternative communication pathway when the alternative communication pathway comprises at least one hop through another MaaS node between the MaaS node and a MaaS controller.

In Example 39, the subject matter of Examples 36-38 includes, a connection loss prediction circuit configured to receive location information of the MaaS node, to receive information from a MaaS controller at or beyond a communication path of the MaaS node, and to predict a loss of the communication path of the MaaS node using the received location information and the received information from the MaaS controller.

In Example 40, the subject matter of Example 39 includes, wherein the connection loss prediction circuit is configured to trigger an increase in buffering of latency-insensitive MaaS communication traffic in response to a predicted loss of the communication path of the MaaS node, the increase in buffering compared to prior to the predicted loss.

In Example 41, the subject matter of Examples 36-40 includes, wherein the prioritization circuit is configured to categorize MaaS communication traffic of the MaaS node into different levels of priority at a protocol layer below a MaaS application layer of a protocol stack and above a communication layer of the protocol stack, and wherein the system comprises: a communication path selection circuit configured to add metadata to the MaaS communication traffic, the metadata comprising information of the levels of priority; and a communication circuit at an access layer of the protocol stack configured to select a radio access technology to communicate the MaaS communication traffic to a MaaS controller using the metadata of the MaaS communication traffic.

In Example 42, the subject matter of Examples 36-41 includes, wherein the MaaS communication traffic comprises MaaS communication packets between the MaaS node and a MaaS controller, and wherein the prioritization circuit is configured to categorize each respective MaaS communication packet using information of the respective MaaS communication packets.

In Example 43, the subject matter of Examples 36-42 includes, wherein the different levels of priority comprise at least a high level priority and a low level priority, wherein the high level priority MaaS communication traffic comprises emergency communication traffic, and wherein the duplication circuit is configured to increase duplication or repetition of high level priority MaaS communication traffic with respect to low level priority MaaS communication traffic.

In Example 44, the subject matter of Example 43 includes, wherein the MaaS node comprises a vehicle, or a component of a vehicle, wherein the MaaS communication traffic comprises emergency communication, user traffic, and fleet management traffic, wherein the prioritization circuit is configured to categorize the emergency communication as a high level priority, the user traffic as a medium level priority, and the fleet management traffic a low level priority using information about the MaaS communication traffic, and wherein the duplication circuit is configured to weight duplication or repetition of high level priority MaaS communication traffic more than medium level priority MaaS communication traffic, and medium level priority MaaS communication traffic more than low level priority MaaS communication traffic.

Example 45 is a system comprising: means for categorizing Mobility-as-a-Service (MaaS) communication traffic of a MaaS node into different levels of priority; and means for controlling duplication or repetition of the MaaS communication traffic using the categorized level of priority of the MaaS communication traffic.

In Example 46, the subject matter of Example 45 includes, means for monitoring a communication path of the MaaS node; means for determining an alternative communication pathway for the MaaS node; and means for limiting traffic on alternative communication pathways to high level priority MaaS communication traffic.

In Example 47, the subject matter of Examples 45-46 includes, means for monitoring a communication path of the MaaS node; means for determining an alternative communication pathway for the MaaS node; and means for limiting traffic on the alternative communication pathway when the alternative communication pathway comprises multiple hops between the MaaS node and a MaaS controller.

In Example 48, the subject matter of Examples 45-47 includes, means for receiving location information of the MaaS node; means for receiving information from a MaaS controller at or beyond an edge of a communication path of the MaaS node; and means for predicting a loss of the communication path of the MaaS node using the received location information and the received information from the MaaS controller.

In Example 49, the subject matter of Example 48 includes, means for triggering an increase in buffering of latency-insensitive MaaS communication traffic in response to a predicted loss of the communication path of the MaaS node, in contrast to that prior to the predicted loss.

In Example 50, the subject matter of Examples 45-49 includes, wherein means for categorizing MaaS communication traffic comprise means for categorizing MaaS communication traffic at a protocol layer below a MaaS application layer of a protocol stack and above a communication layer of the protocol stack, and wherein the system comprises: means for adding metadata to the MaaS communication traffic, the metadata comprising information about the levels of priority; and means for selecting, using a communication circuit at an access layer of the protocol stack, a radio access technology to communicate the MaaS communication traffic to a MaaS controller using the metadata of the MaaS communication traffic.

In Example 51, the subject matter of Examples 45-50 includes, wherein the MaaS communication traffic comprises MaaS communication packets, and wherein the means for categorizing MaaS communication traffic comprises means for categorizing each respective MaaS communication packet using information about the respective MaaS communication packets.

In Example 52, the subject matter of Examples 45-51 includes, wherein the different levels of priority comprise at least a high level priority and a low level priority, wherein the high level priority MaaS communication traffic comprises emergency communication traffic, and wherein means for controlling duplication or repetition of the MaaS communication traffic comprises means for increasing duplication or repetition of high level priority MaaS communication traffic with respect to low level priority MaaS communication traffic.

In Example 53, the subject matter of Example 52 includes, wherein the MaaS communication traffic comprises emergency communication, user traffic, and fleet management traffic, wherein means for categorizing MaaS communication traffic comprises means for categorizing the emergency communication as a high level priority, the user traffic as a medium level priority, and the fleet management traffic a low level priority using information about the MaaS communication traffic, and wherein means for controlling duplication or repetition of the MaaS communication traffic comprises means for weighting duplication or repetition of high level priority MaaS communication traffic more than medium level priority MaaS communication traffic, and medium level priority MaaS communication traffic more than low level priority MaaS communication traffic.

Example 54 is at least one non-transitory machine-readable medium including instructions for improving connectivity of a Mobility-as-a-Service (MaaS) node, the instructions, when executed by hardware circuitry, cause the hardware circuitry to perform operations comprising: categorizing MaaS communication traffic of a MaaS node into different levels of priority; and controlling duplication or repetition of the MaaS communication traffic using the categorized level of priority of the MaaS communication traffic.

In Example 55, the subject matter of Example 54 includes, the operations comprising: monitoring a communication path of the MaaS node; determining an alternative communication pathway for the MaaS node; and limiting traffic on alternative communication pathways to high level priority MaaS communication traffic.

In Example 56, the subject matter of Examples 54-55 includes, the operations comprising: monitoring a communication path of the MaaS node; determining an alternative communication pathway for the MaaS node; and limiting traffic on the alternative communication pathway when the alternative communication pathway comprises multiple hops between the MaaS node and a MaaS controller.

In Example 57, the subject matter of Examples 54-56 includes, the operations comprising: receiving location information of the MaaS node; receiving information from a MaaS controller at or beyond an edge of a communication path of the MaaS node; and predicting a loss of the communication path of the MaaS node using the received location information and the received information from the MaaS controller.

In Example 58, the subject matter of Example 57 includes, the operations comprising: triggering an increase in buffering of latency-insensitive MaaS communication traffic in response to a predicted loss of the communication path of the MaaS node, in contrast to that prior to the predicted loss.

In Example 59, the subject matter of Examples 54-58 includes, wherein categorizing MaaS communication traffic of the MaaS node comprises categorizing MaaS communication traffic of the MaaS node into different levels of priority at a protocol layer below a MaaS application layer of a protocol stack and above a communication layer of the protocol stack, and wherein the operations comprise: adding metadata to the MaaS communication traffic, the metadata comprising information about the levels of priority; and selecting, from an access layer of the protocol stack, a radio access technology to communicate the MaaS communication traffic to a MaaS controller using the metadata of the MaaS communication traffic.

In Example 60, the subject matter of Examples 54-59 includes, wherein the MaaS communication traffic comprises MaaS communication packets, and wherein categorizing MaaS communication traffic comprises categorizing each respective MaaS communication packet using information about the respective MaaS communication packets.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
   a prioritization circuit configured to categorize Mobility-as-a-Service (MaaS) communication traffic of a MaaS node into different levels of priority;
   a duplication circuit configured to control duplication or repetition of the MaaS communication traffic using the categorized level of priority of the MaaS communication traffic; and
   a discovery circuit configured to monitor a communication path of the MaaS node, to determine an alternative communication pathway for the MaaS node, and to limit traffic on alternative communication pathways to high level priority MaaS communication traffic.

2. The system of claim 1,
   wherein the discovery circuit is configured to limit traffic on the alternative communication pathway when the alternative communication pathway comprises at least one hop through another MaaS node between the MaaS node and a MaaS controller.

3. The system of claim 1, comprising:
a connection loss prediction circuit configured to receive location information of the MaaS node, to receive information from a MaaS controller at or beyond a communication path of the MaaS node, and to predict a loss of the communication path of the MaaS node using the received location information and the received information from the MaaS controller.

4. The system of claim 3, wherein the connection loss prediction circuit is configured to trigger an increase in buffering of latency-insensitive MaaS communication traffic in response to a predicted loss of the communication path of the MaaS node, the increase in buffering compared to prior to the predicted loss.

5. The system of claim 1, wherein the prioritization circuit is configured to categorize MaaS communication traffic of the MaaS node into different levels of priority at a protocol layer below a MaaS application layer of a protocol stack and above a communication layer of the protocol stack, and
wherein the system comprises:
a communication path selection circuit configured to add metadata to the MaaS communication traffic, the metadata comprising information of the levels of priority; and
a communication circuit at an access layer of the protocol stack configured to select a radio access technology to communicate the MaaS communication traffic to a MaaS controller using the metadata of the MaaS communication traffic.

6. The system of claim 1, wherein the MaaS communication traffic comprises MaaS communication packets between the MaaS node and a MaaS controller, and
wherein the prioritization circuit is configured to categorize each respective MaaS communication packet using information of the respective MaaS communication packets.

7. The system of claim 1, wherein the different levels of priority comprise at least a high level priority and a low level priority,
wherein the high level priority MaaS communication traffic comprises emergency communication traffic, and
wherein the duplication circuit is configured to increase duplication or repetition of high level priority MaaS communication traffic with respect to low level priority MaaS communication traffic.

8. The system of claim 7, wherein the MaaS node comprises a vehicle, or a component of a vehicle,
wherein the MaaS communication traffic comprises emergency communication, user traffic, and fleet management traffic,
wherein the prioritization circuit is configured to categorize the emergency communication as a high level priority, the user traffic as a medium level priority, and the fleet management traffic a low level priority using information about the MaaS communication traffic, and
wherein the duplication circuit is configured to weight duplication or repetition of high level priority MaaS communication traffic more than medium level priority MaaS communication traffic, and medium level priority MaaS communication traffic more than low level priority MaaS communication traffic.

9. A system comprising:
means for categorizing Mobility-as-a-Service (MaaS) communication traffic of a MaaS node into different levels of priority;
means for controlling duplication or repetition of the MaaS communication traffic using the categorized level of priority of the MaaS communication traffic;
means for monitoring a communication path of the MaaS node;
means for determining an alternative communication pathway for the MaaS node; and
means for limiting traffic on alternative communication pathways to high level priority MaaS communication traffic.

10. The system of claim 9, comprising:
means for limiting traffic on the alternative communication pathway when the alternative communication pathway comprises multiple hops between the MaaS node and a MaaS controller.

11. The system of claim 9, comprising:
means for receiving location information of the MaaS node;
means for receiving information from a MaaS controller at or beyond an edge of a communication path of the MaaS node; and
means for predicting a loss of the communication path of the MaaS node using the received location information and the received information from the MaaS controller.

12. The system of claim 11, comprising:
means for triggering an increase in buffering of latency-insensitive MaaS communication traffic in response to a predicted loss of the communication path of the MaaS node, in contrast to that prior to the predicted loss.

13. The system of claim 9, wherein means for categorizing MaaS communication traffic comprise means for categorizing MaaS communication traffic at a protocol layer below a MaaS application layer of a protocol stack and above a communication layer of the protocol stack, and
wherein the system comprises:
means for adding metadata to the MaaS communication traffic, the metadata comprising information about the levels of priority; and
means for selecting, using a communication circuit at an access layer of the protocol stack, a radio access technology to communicate the MaaS communication traffic to a MaaS controller using the metadata of the MaaS communication traffic.

14. The system of claim 9, wherein the MaaS communication traffic comprises MaaS communication packets, and
wherein the means for categorizing MaaS communication traffic comprises means for categorizing each respective MaaS communication packet using information about the respective MaaS communication packets.

15. The system of claim 9, wherein the different levels of priority comprise at least a high level priority and a low level priority,
wherein the high level priority MaaS communication traffic comprises emergency communication traffic, and
wherein means for controlling duplication or repetition of the MaaS communication traffic comprises means for increasing duplication or repetition of high level priority MaaS communication traffic with respect to low level priority MaaS communication traffic.

16. The system of claim 15, wherein the MaaS communication traffic comprises emergency communication, user traffic, and fleet management traffic,
wherein means for categorizing MaaS communication traffic comprises means for categorizing the emergency communication as a high level priority, the user traffic as a medium level priority, and the fleet management traffic a low level priority using information about the MaaS communication traffic, and wherein means for controlling duplication or repetition of the MaaS communication traffic comprises means for weighting duplication or repetition of high level priority MaaS communication traffic more than medium level priority MaaS communication traffic, and medium level priority MaaS communication traffic more than low level priority MaaS communication traffic.

17. At least one non-transitory machine-readable medium including instructions for improving connectivity of a Mobility-as-a-Service (MaaS) node, the instructions, when executed by hardware circuitry, cause the hardware circuitry to perform operations comprising:

categorizing MaaS communication traffic of a MaaS node into different levels of priority;

controlling duplication or repetition of the MaaS communication traffic using the categorized level of priority of the MaaS communication traffic;

monitoring a communication path of the MaaS node;

determining an alternative communication pathway for the MaaS node; and limiting traffic on alternative communication pathways to high level priority MaaS communication traffic.

18. The at least one machine-readable medium of claim 17, the operations comprising:

limiting traffic on the alternative communication pathway when the alternative communication pathway comprises multiple hops between the MaaS node and a MaaS controller.

19. The at least one machine-readable medium of claim 17, the operations comprising:

receiving location information of the MaaS node;

receiving information from a MaaS controller at or beyond an edge of a communication path of the MaaS node; and predicting a loss of the communication path of the MaaS node using the received location information and the received information from the MaaS controller.

20. The at least one machine-readable medium of claim 19, the operations comprising:

triggering an increase in buffering of latency-insensitive MaaS communication traffic in response to a predicted loss of the communication path of the MaaS node, in contrast to that prior to the predicted loss.

21. The at least one machine-readable medium of claim 17, wherein categorizing MaaS communication traffic of the MaaS node comprises categorizing MaaS communication traffic of the MaaS node into different levels of priority at a protocol layer below a MaaS application layer of a protocol stack and above a communication layer of the protocol stack, and wherein the operations comprise:

adding metadata to the MaaS communication traffic, the metadata comprising information about the levels of priority; and selecting, from an access layer of the protocol stack, a radio access technology to communicate the MaaS communication traffic to a MaaS controller using the metadata of the MaaS communication traffic.

22. The at least one machine-readable medium of claim 17, wherein the MaaS communication traffic comprises MaaS communication packets, and wherein categorizing MaaS communication traffic comprises categorizing each respective MaaS communication packet using information about the respective MaaS communication packets.

23. A system comprising:

a prioritization circuit configured to categorize Mobility-as-a-Service (MaaS) communication traffic of a MaaS node into different levels of priority;

a duplication circuit configured to control duplication or repetition of the MaaS communication traffic using the categorized level of priority of the MaaS communication traffic; and a connection loss prediction circuit configured to receive location information of the MaaS node, to receive information from a MaaS controller at or beyond a communication path of the MaaS node, and to predict a loss of the communication path of the MaaS node using the received location information and the received information from the MaaS controller.

24. The system of claim 23, wherein the connection loss prediction circuit is configured to trigger an increase in buffering of latency-insensitive MaaS communication traffic in response to a predicted loss of the communication path of the MaaS node, the increase in buffering compared to prior to the predicted loss.

25. The system of claim 23, comprising:

a discovery circuit configured to monitor a communication path of the MaaS node, to determine an alternative communication pathway for the MaaS node, and to limit traffic on alternative communication pathways to high level priority MaaS communication traffic.

26. The system of claim 23, comprising:

a discovery circuit configured to configured to monitor a communication path of the MaaS node and to determine an alternative communication pathway for the MaaS node, wherein the discovery circuit is configured to limit traffic on the alternative communication pathway when the alternative communication pathway comprises at least one hop through another MaaS node between the MaaS node and a MaaS controller.

27. The system of claim 23, wherein the prioritization circuit is configured to categorize MaaS communication traffic of the MaaS node into different levels of priority at a protocol layer below a MaaS application layer of a protocol stack and above a communication layer of the protocol stack, and wherein the system comprises:

a communication path selection circuit configured to add metadata to the MaaS communication traffic, the metadata comprising information of the levels of priority; and a communication circuit at an access layer of the protocol stack configured to select a radio access technology to communicate the MaaS communication traffic to a MaaS controller using the metadata of the MaaS communication traffic.

28. The system of claim 23, wherein the different levels of priority comprise at least a high level priority and a low level priority, wherein the high level priority MaaS communication traffic comprises emergency communication traffic, and wherein the duplication circuit is configured to increase duplication or repetition of high level priority MaaS communication traffic with respect to low level priority MaaS communication traffic.

29. A system comprising:

means for categorizing Mobility-as-a-Service (MaaS) communication traffic of a MaaS node into different levels of priority;

means for controlling duplication or repetition of the MaaS communication traffic using the categorized level of priority of the MaaS communication traffic;
means for receiving location information of the MaaS node;
means for receiving information from a MaaS controller at or beyond an edge of a communication path of the MaaS node; and
means for predicting a loss of the communication path of the MaaS node using the received location information and the received information from the MaaS controller.

30. The system of claim 29, comprising:
means for triggering an increase in buffering of latency-insensitive MaaS communication traffic in response to a predicted loss of the communication path of the MaaS node, in contrast to that prior to the predicted loss.

31. The system of claim 29, comprising:
means for monitoring a communication path of the MaaS node;
means for determining an alternative communication pathway for the MaaS node; and
means for limiting traffic on alternative communication pathways to high level priority MaaS communication traffic.

32. The system of claim 29, comprising:
means for monitoring a communication path of the MaaS node;
means for determining an alternative communication pathway for the MaaS node; and
means for limiting traffic on the alternative communication pathway when the alternative communication pathway comprises multiple hops between the MaaS node and a MaaS controller.

33. The system of claim 29, wherein the different levels of priority comprise at least a high level priority and a low level priority,
wherein the high level priority MaaS communication traffic comprises emergency communication traffic, and
wherein means for controlling duplication or repetition of the MaaS communication traffic comprises means for increasing duplication or repetition of high level priority MaaS communication traffic with respect to low level priority MaaS communication traffic.

34. The system of claim 33, wherein the MaaS communication traffic comprises emergency communication, user traffic, and fleet management traffic,
wherein means for categorizing MaaS communication traffic comprises means for categorizing the emergency communication as a high level priority, the user traffic as a medium level priority, and the fleet management traffic a low level priority using information about the MaaS communication traffic, and
wherein means for controlling duplication or repetition of the MaaS communication traffic comprises means for weighting duplication or repetition of high level priority MaaS communication traffic more than medium level priority MaaS communication traffic, and medium level priority MaaS communication traffic more than low level priority MaaS communication traffic.

35. At least one non-transitory machine-readable medium including instructions for improving connectivity of a Mobility-as-a-Service (MaaS) node, the instructions, when executed by hardware circuitry, cause the hardware circuitry to perform operations comprising:
categorizing MaaS communication traffic of a MaaS node into different levels of priority;
controlling duplication or repetition of the MaaS communication traffic using the categorized level of priority of the MaaS communication traffic;
receiving location information of the MaaS node;
receiving information from a MaaS controller at or beyond an edge of a communication path of the MaaS node; and
predicting a loss of the communication path of the MaaS node using the received location information and the received information from the MaaS controller.

36. The at least one machine-readable medium of claim 35, the operations comprising:
triggering an increase in buffering of latency-insensitive MaaS communication traffic in response to a predicted loss of the communication path of the MaaS node, in contrast to that prior to the predicted loss.

37. The at least one machine-readable medium of claim 35, the operations comprising:
monitoring a communication path of the MaaS node;
determining an alternative communication pathway for the MaaS node; and
limiting traffic on alternative communication pathways to high level priority MaaS communication traffic.

38. The at least one machine-readable medium of claim 35, the operations comprising:
monitoring a communication path of the MaaS node;
determining an alternative communication pathway for the MaaS node; and
limiting traffic on the alternative communication pathway when the alternative communication pathway comprises multiple hops between the MaaS node and a MaaS controller.

39. The at least one machine-readable medium of claim 35, wherein categorizing MaaS communication traffic of the MaaS node comprises categorizing MaaS communication traffic of the MaaS node into different levels of priority at a protocol layer below a MaaS application layer of a protocol stack and above a communication layer of the protocol stack, and
wherein the operations comprise:
adding metadata to the MaaS communication traffic, the metadata comprising information about the levels of priority; and
selecting, from an access layer of the protocol stack, a radio access technology to communicate the MaaS communication traffic to a MaaS controller using the metadata of the MaaS communication traffic.

40. The at least one machine-readable medium of claim 35, wherein the MaaS communication traffic comprises MaaS communication packets, and
wherein categorizing MaaS communication traffic comprises categorizing each respective MaaS communication packet using information about the respective MaaS communication packets.

* * * * *